July 28, 1942.    L. FRANKEL    2,290,853
REEL FOR PHOTOGRAPHIC FILMS
Filed Feb. 17, 1941
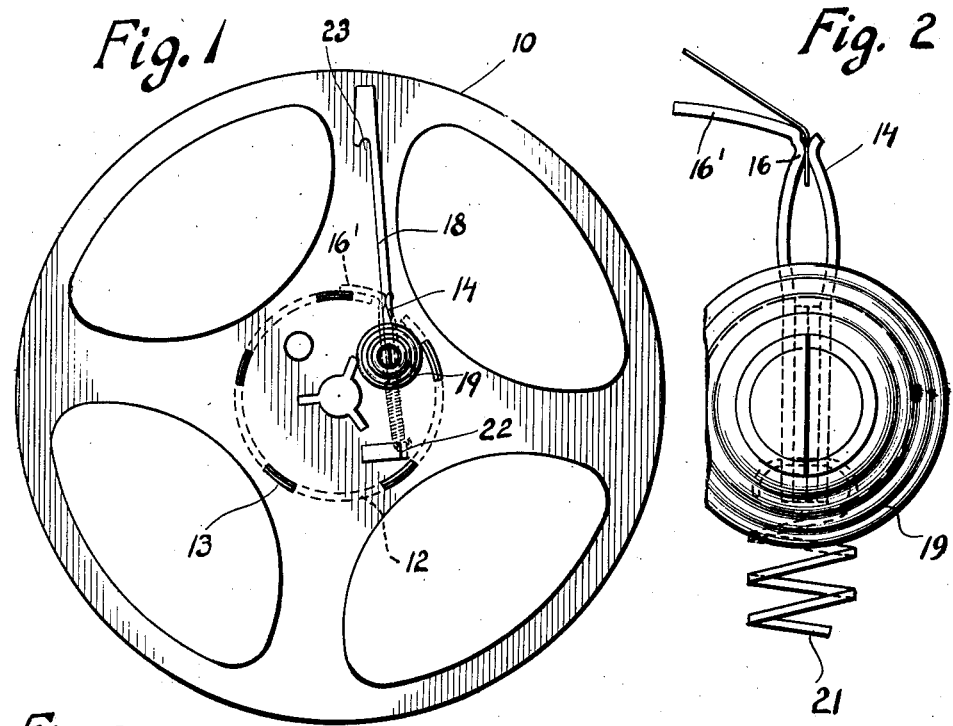
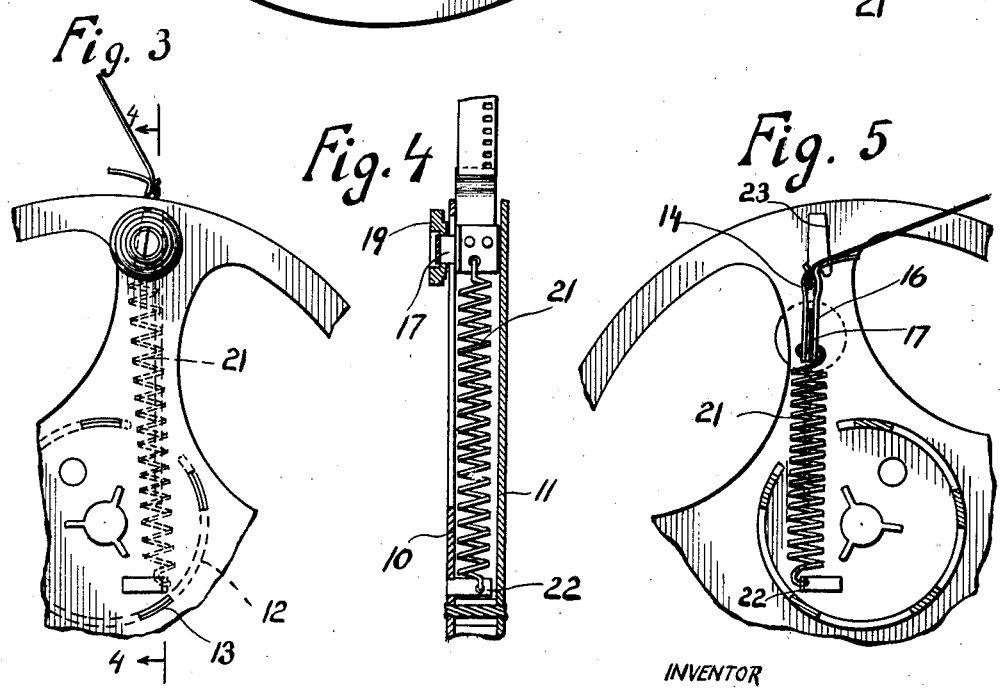
INVENTOR
LEO FRANKEL Patented July 28, 1942

2,290,853

UNITED STATES PATENT OFFICE 2,290,853

REEL FOR PHOTOGRAPHIC FILMS

Leo Frankel, Chicago, Ill., assignor to Franklin Photographic Industries, Inc., Chicago, Ill., a corporation of Illinois Application February 17, 1941, Serial No. 379,164

3 Claims. (Cl. 242—74)

My invention relates to reels for photographic films and has, as its principal object, the provision of improved means for securing the end of the film preparatory to coiling a length thereof on the hub and between the side members of the reel.

Reels utilized for so-called professional film, that is to say, 35 mm. film, are, as a rule, constructed so that the side pieces of the reel are removable from the hub so that no problem with respect to fastening the inner end of the film is encountered. Reels intended for operation with small film used by amateurs, however, such as 8 mm. or 16 mm. film, cannot suitably be constructed to permit removal of the side members from the hub and the result is that there is considerable difficulty in fastening the inner end of the film to the hub of the reel. Various suggestions have been made with respect to means for overcoming this difficulty, but, so far as I am aware, none has been sufficiently satisfactory from the standpoint of cost and convenience to be adopted to any significant extent.

In accordance with my invention, I utilize a clip mounted in a guide and held near the hub by a spring, thus permitting the clip to be moved along the guide to the periphery of the circular side members. Thus, that portion of the clip which engages the film is extendable beyond the side pieces of the reel and the film end is readily attached to the clip. On release of the clip, the spring functions to draw the clip with the attached film down to the hub portion of the reel, with the result that the inner or beginning end of the film assumes the proper position with respect to the hub. Thence, rotation of the reel will result in winding the film on the reel in the ordinary manner. Preferably, means such as an offset or bayoneted indentation in a slot comprising the clip guide is provided, so that the clip is retained in its outer position without being held by the fingers.

I have shown in the drawing a preferred embodiment of the invention, wherein—

Fig. 1 is a side elevational view of a reel constructed in accordance with my invention;

Fig. 2 is an enlarged view showing a portion of the reel utilizable to attach a film end thereto;

Fig. 3 is a fragmentary elevational view, similar to Fig. 1 but showing a film engaging member extending to that position to which it is moved before the film is fastened thereto;

Fig. 4 is a fragmentary sectional view taken along the line 4—4 of Fig. 3 looking in the direction of the arrows; and Fig. 5 is a view, partly in section and partly in elevation, looking in the opposite direction of Fig. 3 and showing the film engaging and retracting means in elevation.

The reel proper comprises side members 10 and 11 and a hub portion 12. The hub portion may be formed in any usual way, but, as illustrated generally in the drawing, it comprises a circular piece of sheet metal having side projections 13 extending through annularly disposed arcuate slots in the side members 10 and 11, the projecting edges of which projections are deformed as by a riveting or peening operation to secure the hub and side pieces together. My invention is not concerned primarily with the construction of the hub or side pieces of the reel, except in so far as such construction may have a bearing upon the invention as claimed. The reel is as shown provided with usual means for attaching it to a spindle of a projection apparatus.

The film attaching mechanism comprises a clip composed of members 14 and 16 suitably formed, as shown, and separated by a spacer and guide member 17, the entire assembly comprising these members being secured together by a riveting operation, spot welding operation or other suitable means. The clip members 14 and 16 are formed of suitable material having the characteristics of a spring, and the ends are prefabricated before assembly to have a suitable shape, such as shown in the drawing. The clip member 16 is provided with an offset portion 16′ which is generally arcuate so that in the retracted position said offset portion 16′ lies along the outer surface of the hub 12 whereby to leave substantially a smooth surface on said hub and provide an index of the direction in which the reel should be turned. In other words, the reel should be turned in the direction in which the offset member 16′ extends along the periphery of the hub 12. A portion of the spacer and guide member 17 extends beyond the margin of the clip members 14 and 16 and through a slot 18, which thereby acts as a guide in a manner to be shown. A thumb or finger engaging member 19 is secured to the extending end of the spacer and guide member 17. A spring 21 has one end attached to an upstanding tab 22 struck up from the material of the side member 10, and the other end of the spring is attached to the clip assembly comprising the members 14, 16 and 17. Looking at Fig. 5, it will be seen that the point of attachment of the spring 21, in this case the tab 22, is positioned a considerable distance within the hub, and the spring extends through an opening in the hub portion 12 so that, as clearly seen from Fig. 1, the spring and the major portion of the clip are retractable within the hub. A projection 23 formed by an enlarged offset in the slot 18 supports the clip assembly in extended position whereby to facilitate fastening of the film. Release of the clip assembly from the projection 23 allows the spring to retract the clip assembly and attached end of the film substantially to the periphery of the hub 12.

The construction of the device of my invention and the manner of using it should, in general, be clear from the above description. I wish to point out, however, that all of the parts are simply and cheaply made so that the added cost of a reel resulting from the use of the improved features of my invention is very little.

To construct the side members 10 and 11, a simple stamping operation from sheet metal is all that is required. The slot 18, including the offset portion providing the projection 23, may be formed in the side members with the same operation as that used in forming them, that is to say, only a single die is required. While I have shown the side member 11 without a slot, there is no objection to having the two side members identical, or they may be constructed with the same die as the side piece 10, with the portion utilized for forming the slot 18 constructed in the form of an insert so that the side member 11 may be formed without the slot.

The film clip assembly is formed by simple known operations, and the spring 21 may be formed in the usual manner by means of an automatic coiling machine. In assembly, the clip, spring and associated mechanism may be formed as a sub-assembly, then secured in position on the side member 10, the end of the spring secured to the tab 22 and, as a final operation, the hub and side members riveted or peened together to complete the final assembly.

To use the reel, the member 19 is engaged, for example, with the thumb, and slid along to the offset portion of the slot 18, whence a slight turning movement will serve to engage the spacer and guide member 17 over the projection 23 and thus hold the clip assembly in the position shown in Figs. 3 and 4. By pressing downwardly on the offset portion 16', the clip members 14 and 16 are slightly separated, and the film may be inserted between them readily. Suitable means including proper adjustment of tension, roughing of the members 14 and 16 where they engage the film, and the like, are provided to assure the user that the clip will continue to hold the film firmly. The clip assembly is released, disengaging the member 17 from the projection 23, and the spring then withdraws the entire assembly to the position shown in Fig. 1. It will be noted that in this position the portion 16' engages against the hub to position the end of the film. Rotation of the reel will now have the effect of winding the film on the hub of the reel in the ordinary manner.

By inspecting Fig. 1, it will be observed that the guide slot 18 extends to the side of the hub axis, and, in this way, the retraction of the entire spring and most of the clip assembly within the hub is facilitated. It will be noted, also, as previously pointed out, that the portion 16' is generally arcuate, so that it lies along the outer surface of the hub, and the remaining portion of the clip is below this surface, thus leaving substantially a smooth surface on which the film is wound. The arrangement, as hereinabove stated, also furnishes a guide to the direction in which the reel is to be placed on a spindle, as of a projection device.

I have described the illustrated embodiment of my invention in detail in order that those skilled in the art may understand what I believe to be the best manner of constructing and using the same. The scope of the invention is limited, however, only by the appended claims.

What I claim as new and desire to protect by Letters Patent of the United States is:

1. In a reel of the character described, a hub, side members secured to the hub, means forming a guide on a side member extending from said hub substantially to the outer edge of the side member, a film clip assembly mounted to move in said guide, said film clip assembly including a clip for engaging a film and being so constructed and arranged as to permit a portion thereof to lie substantially flat against the hub of the reel, resilient means for normally retaining a portion of said film clip assembly in a position against said hub and releasable means for securing said film clip assembly at a position where the said film engaging clip assembly lies substantially along the periphery of said side members, said last-mentioned means comprising a projection on one of said side members near the periphery thereof, the film clip assembly being adjustable to engage it over said projection.

2. A reel comprising two circular side members and a hub member between them, the hub member being generally annular but having an opening on its periphery, a coil spring having one end secured within the hub at a position to permit extension of the other end of the spring through said hub opening, a film clip assembly secured to the free end of the said coil spring, said clip assembly including a guide portion and a pair of film engaging members, a slot in one side member through which the guide portion projects, said slot being provided with an offset portion near the outer terminus thereof providing a projection, the said guide portion being engageable over said projection whereby to hold said film clip assembly in extended position, a projecting end of the guide portion being engageable by an operator to move the clip assembly toward the hub or periphery of the side member with said slot as a guide, the pair of film engaging members being so constructed and arranged that one may be withdrawn substantially entirely within the hub by said coil spring, and the other lie along the outer surface of the hub, whereby to leave substantially a smooth surface on said hub and provide an index of the direction in which the reel should be turned.

3. In a reel, a pair of circular side members, a hub of generally circular shape secured between the side members, ends of the hub being separated to provide a peripheral opening, the reel being provided with usual means at its axis for support on a shaft as of a projection machine, one of the side members having a slot extending from near its periphery in a direction toward one side of the axis and terminating near the periphery of the hub, a film clip assembly comprising a pair of film engaging members for engaging a film, a guide member extending through said slot as a guide, and a finger engaging member on an extending end of the guide member to secure the said guide member in the slot and provide means for adjusting the position of the clip assembly, and a coil spring having one end secured within the hub at a point in line with said slot and the other end secured to said clip assembly, said slot having an end portion providing a projection over which said guide member is adapted to be engaged to hold the clip assembly and spring in extended position, the said spring and clip assembly being so constructed and arranged that on release of the guide member from said projection, the entire spring and major proportion of the clip assembly are retracted within the hub, and the film engaging members are held smoothly against the periphery of the hub.

LEO FRANKEL.